Jan. 26, 1971   JEAN-CLAUDE L. M. ROUSSET   3,559,047
RESERVE BATTERY AND TESTING DEVICE THEREFOR
Filed Nov. 8, 1967   3 Sheets-Sheet 1
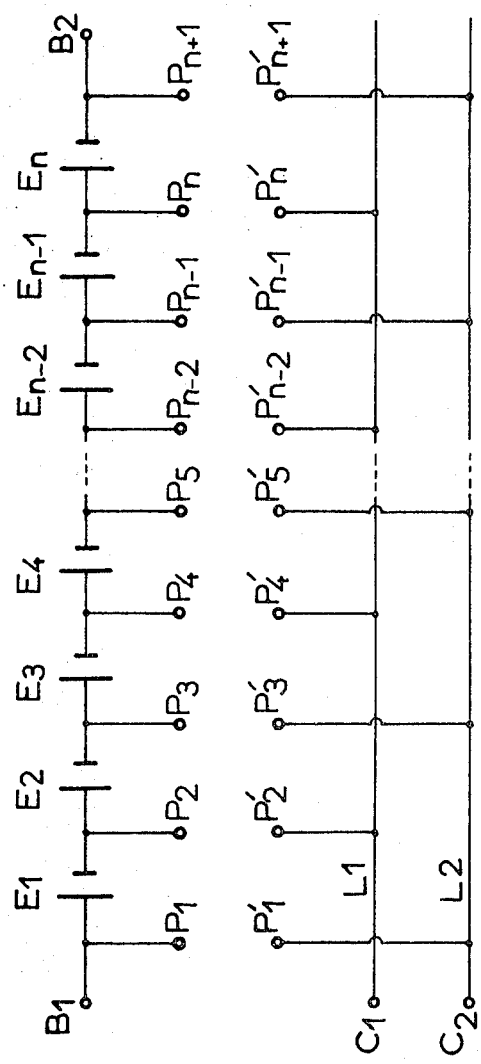
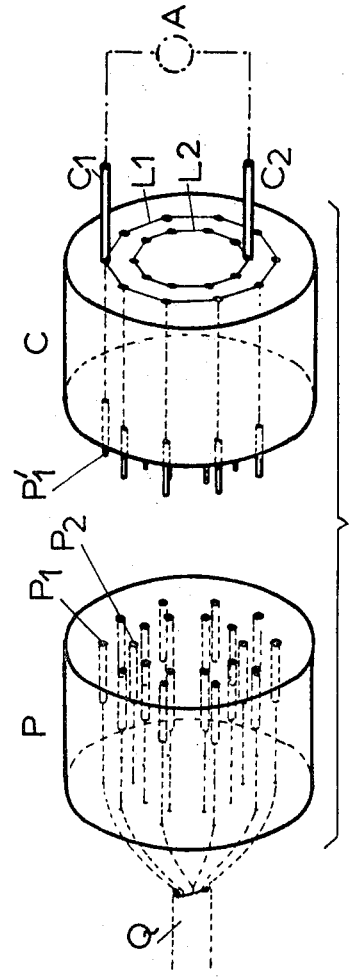
Fig.1
Fig.2
Fig.3
INVENTOR
JEAN CLAUDE LUCIEN MAURICE ROUSSET
BY
Woodhams, Blanchard & Flynn
ATTORNEYS United States Patent Office 3,559,047
Patented Jan. 26, 1971

3,559,047
RESERVE BATTERY AND TESTING DEVICE THEREFOR
Jean-Claude Lucien Maurice Rousset, Paris, France, assignor to Societe les Piles Wonder, Saint-Ouen, Seine-Saint-Denis, France, a corporation of France
Filed Nov. 8, 1967, Ser. No. 681,457
Claims priority, application France, Nov. 14, 1966, 83,487
Int. Cl. G01n 27/42
U.S. Cl. 324—29.5                                    8 Claims

ABSTRACT OF THE DISCLOSURE

A reserve battery having a plurality of activatable cells connected in series. A plurality of test connectors are connected to the battery with one connector being connected to the input of the first series-connected cell and another connector being connected to the output of the last series-connected cell. The remaining test connectors are alternately connected between adjacent pairs of cells. A testing device is connectible to the battery for determining in a single test operation whether any of the cells have been accidentally activated prior to intentional activation of the battery.

---

This invention is directed to an electric reserve battery comprising activatable electrochemical cells of the primary or secondary type as well as to a method for testing said battery and a device for the execution of said method.

Electrochemical batteries such as primary batteries and secondary or storage batteries are of the so-called "reserve" or "activated" type when ionic conduction between the positive and negative electrodes of each cell is only permitted designedly and just before the batteries are put into use.

The advantages of said reserve batteries have already been recognized. However, such batteries are subject to one known disadvantage which is by no means negligible, and which arises from the fact that it is difficult to determine prior to use, that is, prior to activation of the battery whether the cells of a battery have suffered degradation to an extent which is liable to affect their good operation. This holds true when the so-called activatable cells are at least two in number and connected electrically in series.

In point of fact, at the two output terminals of a battery of activatable electrochemical cells which are disposed electrically in series or at least some of which are disposed electrically in series, there is no means of detecting accidental activation or short-circuiting of one or a number of cells if only a single cell of the series has remained inactive, since this cell is sufficient to prevent the flow of current through the whole series and consequently to prevent any possibility of checking.

In fact, accidents of this type can arise, for example, when the battery has been subjected to accelerations, shocks, vibrations or the like. Testing is therefore essential to operational safety of electrochemical batteries of the activated type.

The testing operation referred to consists in checking the existence of any ionic or electronic linkage between the positive and negative electrodes of each activatable electrochemical cell. And when the number of cells connected in series is substantial, an extremely large number of electrical connections have to be established either inside or outside the battery, thereby entailing a long series of operations which are subject to errors by omission or which call for the use of a complex system.

The object of the present invention is to overcome the above-mentioned disadvantages. To this end, the invention is directed to a battery of activatable electrochemical cells of the type comprising $n$ activatable cells in series, said battery being characterized in that it comprises in addition to the positive and negative output terminals of the battery $(n+1)$ test terminals, one of which is connected to the output of the last cell whilst the other is connected to the input of the first cell and the remaining $(n-1)$ terminals are each connected between two cells.

It is apparent that, by connecting a suitable measuring instrument into circuit, a battery is thus provided in which it is possible to determine whether the cell to whose output terminals said test terminals are conneced either has or has not undergone any degradation which has resulted in ionic or electronic linkage.

However, this is also a checking operation which can in certain cases result in considerable loss of time and even errors.

It is for this reason that the invention also contemplates a method for testing a battery of the type referred to above which is essentially characterized in that the successive test terminals are connected alternately to two lines between which a suitable testing instrument is then connected.

It is understood that, by virtue of this particularly advantageous method, a battery of the type under consideration can be tested, prior to activation, in a single operation irrespective of the number $n$ of its series cells, inasmuch as any cell which may either be accidentally activated or short-circuited results in ionic or electronic linkage between the two lines, said linkage being detected by the testing instrument.

Finally, the invention is also concerned with a device for the practical application of said method which is essentially characterized in that it comprises $(n+1)$ test terminals which can be connected to the $(n+1)$ test terminals of the battery, said terminals of the testing device being connected alternately to two lines which are in turn connected to two output connector-terminals which are capable of receiving the connector-terminals of the testing instrument.

It is apparent that, by means of this device, testing of a whole series of batteries can be performed in a simple, extremely rapid and systematic manner by connecting the test terminals of each battery to the test terminals of the testing device and by reading the measurement on the testing instrument.

As an advantageous feature, and in order to facilitate operations still further, the test terminals of the battery are grouped together in an output connector whilst the test terminals of the testing device are grouped together in a corresponding connector in which said terminals are connected to the two lines which terminate in two connector-terminals.

One advantage of this device which is of particular interest lies in the fact that, while the output connector of the battery comprises $(n+1)$ terminals as in the case of the test connector of the testing device, only two lines are required between the testing device and the testing instrument which may be relatively distant, irrespective of the number $n$ of battery cells.

However, it can readily be appreciated that, each time it proves impossible for such a reason as difficulty of access, for example, to connect the test connector directly to the battery, it is necessary to make provision for an extension cable comprising $(n+1)$ conductors, which may be a disadvantage in some cases when cabling has to be reduced to a minimum.

For the reason just mentioned, the invention accordingly extends to an improvement which is intended to make available to users a battery which is so designed that any extension cable which may prove necessary only comprises two conductors, said improvement being characterized in that the test terminals of the battery are connected inside the battery alternately to two conducting lines terminating in two output connector-terminals which are preferably grouped together in an output socket-connector.

It is thus apparent that a measuring instrument such as a megohm meter can be connected to the output connector-terminals of the battery, that the appearance of an accidental ionic or electronic linkage within either one or a number of battery cells can be detected, and that the cable which connects the instrument to the battery will always have two conductors irrespective of the number of battery cells.

In a first preferential arrangement, resistors are inserted between each of the test terminals and the two lines. In another arrangement, resistors are placed in the lines themselves between the points of connection of said lines with the $(n+1)$ test terminals.

The explanations which now follow will in fact clearly demonstrate that the value to be given to each of the inserted resistors can readily be determined by calculation so that, at the time of utilization of the battery, that is to say when the ionic linkage is established intentionally between the positive and negative electrodes of each cell, the currents which flow in the meshes other than the main series-connection line of the cells are of an extremely low order and even become negligible in comparison with the load current.

A clear understanding of the invention will in any case be gained by consideration of the following description, reference being made to the accompanying drawings in which one form of execution is shown by way of non-limitative example, and in which:

FIG. 1 is a schematic presentation of a battery of the activated cell type in accordance with the invention;

FIG. 2 shows the arrangement of the corresponding test lead-out connections;

FIG. 3 shows an example of a lead-out connector and test connector which are intended to be employed for checking purposes.

Figure 4:
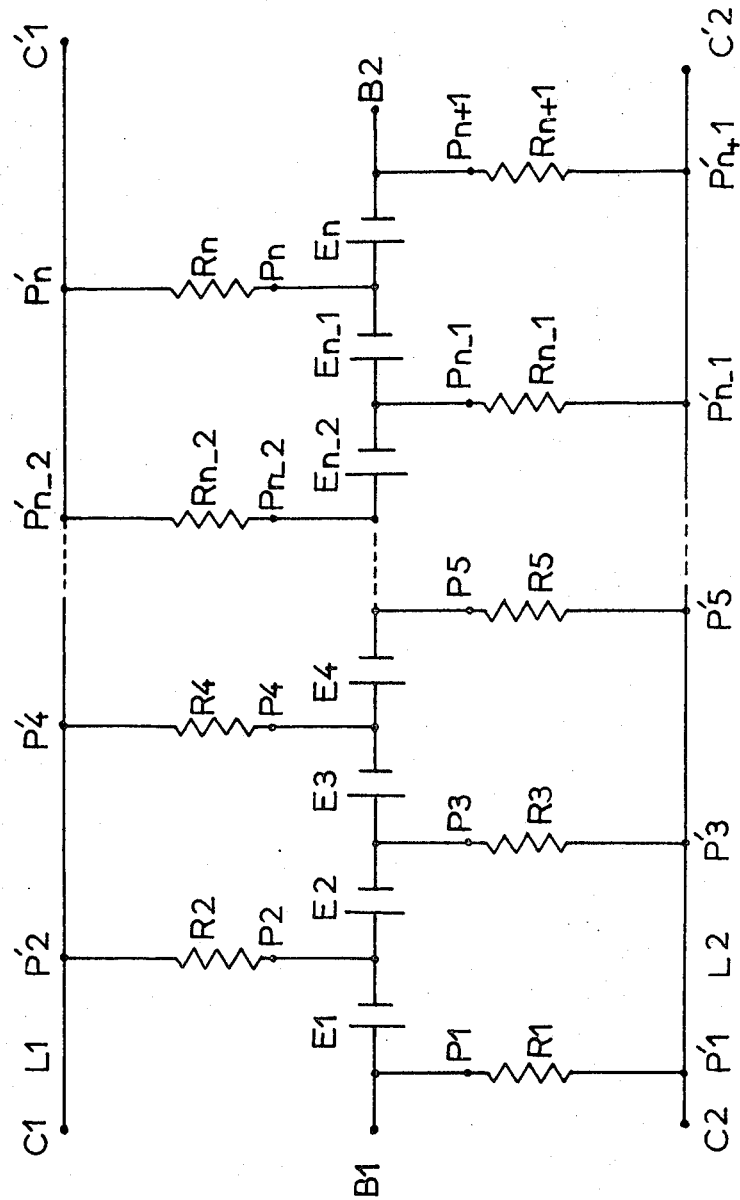
FIGS. 4 and 5 show diagrammatically two other batteries in accordance with the invention.

There is shown in FIG. 1 a battery which is constituted in a simple manner by $n$ activatable electrochemical cells $E_1$, $E_2$, $E_3$, etc. $E_{n-2}$, $E_{n-1}$, $E_n$ mounted in series between the output terminals $B_1$ and $B_2$ of the battery.

It is also apparent from FIG. 1 that, in accordance with the invention, test terminals $P_1$, $P_2$, $P_3$, $P_4$, $P_5$, $P_{n-2}$, $P_{n-1}$, $P_n$ and $P_{n+1}$ have been connected as follows: terminal $P_1$ to the output of cell $E_1$, terminal $P_2$ between cell $E_1$ and cell $E_2$, terminal $P_3$ between cell $E_2$ and cell $E_3$, and so on in sequence until the terminal before the last, namely $P_n$, which has been connected between cell $E_{n-1}$ and cell $E_n$, and the last terminal which has been connected between cell $E_n$ and terminal $B_2$.

FIG. 3 shows the manner in which the test terminals referred to can readily be mounted in a socket-connector P in the form of female terminals connected by means of a cable Q to $(n+1)$ insulated conductors, to $n$ outputs of the cells of a conventional battery and to the input of the first cell.

The test terminals which are intended to cooperate with the test terminals referred to above are shown in FIG. 2. There are in fact shown in this figure $(n+1)$ terminals $P'_1$, $P'_2$, $P'_3$, etc. $P'_{n-1}$, $P'_n$, $P'_{n+1}$ which are connected alternately to two lines $L_1$, $L_2$ and said lines are in turn led out to two output connector-terminals $C_1$, $C_2$. Thus, every second one of the terminals $P'_1$, $P'_2$, etc. connects to one connector-terminal and the remaining terminals $P'_1$, $P'_2$, etc., connect to the other connector-terminal.

The test connector C is shown in FIG. 3 in which there can again be seen the terminals $P'_1$, $P'_2$, etc. which are each located opposite their corresponding terminal of the socket-connector P and the two lines $L_1$ $L_2$, in which $L_1$ is connected to the terminals $P'_1$, $P'_3$, $P'_5$ etc. and $L_2$ is connected to the terminals $P'_2$, $P'_4$, $P'_6$ etc.

It will additionally be noted in this connection that, depending on whether the battery comprises an even or an uneven number of cells, the numbers of terminals of type $P'$ which are connected to the line will either be equal to or different from 1.

Finally, there have been shown in FIG. 3 the test terminals $C_1$ and $C_2$ which can be connected simply to the corresponding terminals of a testing instrument A such as, for example, a megohm meter.

It will now be readily understood that, in order to carry out a test on the unactivated battery which is shown in FIG. 1, it is merely necessary to plug the test connector C into the lead-out connector P and to observe whether an ionic or electronic linkage has occurred in any one of the cells by means of the indication which is supplied by the testing instrument.

In fact, if it is assumed, for example that the cell $E_3$ is short-circuited or has been accidentally activated, it can be visualized that, by way of terminals $P_3$ and $P_4$, and terminals $P'_3$ ad $P'_4$, both the lines $L_1$ and $L_2$ and then the output terminals $C_1$ and $C_2$ will be connected ionically or electronically and it will therefore be possible to detect the occurrence of an ionic or electronic linkage by means of the indication supplied by the instrument.

Finally, it is apparent that, even in the case of large installations of reserve batteries of the same type, tests can be carried out very rapidly by successively inserting the plug-connector C in the successive socket-connectors P of the batteries. Similarly, one or a number of batteries can be tested prior to use both instantaneously and without entailing the need for any operation inside the battery.

Furthermore, it should be emphasized that, when the checking operation has been completed and provided of course that the test connector has been withdrawn, the batteries are in readiness for use without requiring any special manipulation since no circuit is closed across any of the battery terminals.

Reference will now be made to FIGS. 4 and 5 which again show a battery of $n$ activatable electrochemical cells $E_1$, $E_2$, $E_3$ . . . $E_{n-2}$, $E_{n-1}$, $E_n$ which are mounted in series as well as the output terminals $B_1$ and $B_2$ of the battery.

However, the test terminals $P_1$, $P_2$, $P_3$, $P_4$, $P_5$ . . . $P_{n-2}$, $P_{n-1}$, $P_n$ and $P_{n+1}$ have been connected as follows: terminal $P_1$ to the output of cell $E_1$, terminal $P_2$ between cell $E_1$ and cell $E_2$, terminal $P_3$ between cell $E_2$ and cell $E_3$, etc., up to the penultimate terminal $P_n$ which has been connected between cell $E_{n-1}$ and cell $E_n$ and the last terminal has been connected between cell $E_n$ and terminal $B_2$.

In FIG. 4, the test terminals $P_1$, $P_2$ . . . $P_{n+1}$ are connected inside the battery alternately to two conducting lines $L_1$ and $L_2$ which terminate in output connector terminals $C_1$ and $C_2$. There are shown $(n+1)$ connection points $P'_1$, $P'_2$, $P'_3$, etc. $P'_{n-1}$, $P'_n$, $P'_{n+1}$ which are connected alternately to the two lines $L_1$, $L_2$; said lines terminate in turn at the two output connector-terminals $C_1$ (or $C'_1$) and $C_2$ (or $C'_2$).

Between the terminals $P_1$ and $P'_1$, $P_2$ and $P'_2$ etc. $P_{n+1}$ and $P'_{n+1}$, there are inserted in addition resistors $R_1$, $R_2$ . . . $R_{n+1}$.

When a suitable testing instrument such as a megohm meter is connected between the terminals $C_1$ (or $C'_1$) and $C_2$ (or $C'_2$), there may be found to exist an ionic or electronic linkage in any one of the cells.

In fact, the electric circuit which is normally open between $C_1$ (or $C'_1$) and $C_2$ (or $C'_2$) will accordingly be closed when this ionic or electronic linkage is established; the value which is read on the measuring instrument in the event of appearance of said linkage will obviously depend on the value of the inserted resistors.

For example, should an ionic or electronic linkage take place within the cell $E_4$, the megohm meter circuit will close across the terminals $C_1$ (or $C'_1$) and $C_2$ (or $C'_2$) in the mesh $L_1$, $P'_4$, $R_4$, $P_4$, $E_4$, $P_5$, $R_5$, $P'_5$ and $L_2$ and it will be observed that, irrespective of the order of the cell which exhibits the fault, the number of resistors connected into circuit is always equal to two.

This arrangement is therefore particularly advantageous since it permits a reproducible and therefore accurate measurement.

It appears evident that sufficiently high values must be adopted in the case of the inserted resistors (from 100,000 ohms to 1,000,000 ohms, for example) in order that, at the time of utilization of the battery after intentional activation, the power delivered at the terminals $B_1$ and $B_2$ is practically unaffected by the power which is dissipated in the secondary meshes of the test network.

Figure 5:
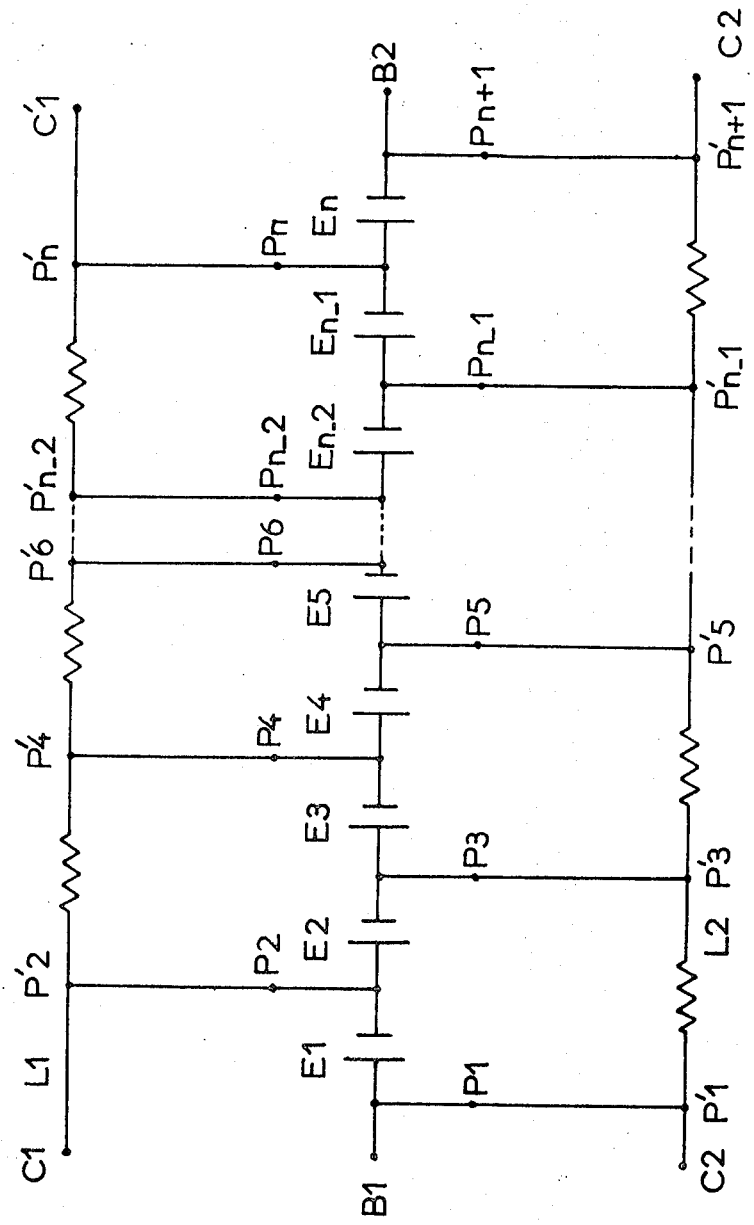

In accordance with the arrangement which is shown in FIG. 5, the test terminals $P_1$, $P_2$, etc. $P_{n+1}$ are directly connected to the junction points $P'_1$ and $P'_2$, etc. $P'_{n+1}$ and resistors are on the other hand inserted in the line $L_1$ between $P'_2$ and $P'_4$ etc. $P'_{n-2}$ and $P'_n$ and in the line $L_2$ between $P'_1$ and $P'_3$, etc., $P'_{n-1}$ and $P'_{n+1}$.

Similarly, in the case of the arrangement shown in FIG. 4, when a suitable testing instrument such as a megohm meter is connected between the terminals $C_1$ (or $C'_1$) and $C_2$ (or $C'_2$), it will be possible to detect any ionic or electronic linkage which may have taken place.

However, a linkage of this nature establishes a series connection between the battery cell proper and a number of resistors which is dependent on the order of the cell in respect of a predetermined battery, on the number of battery cells and also on the choice of test terminals $C_1$ or $C'_1$ and $C_2$ or $C'_2$.

It would therefore appear that, in practice, the arrangement in accordance with FIG. 5 should be discarded in favor of the arrangement shown in FIG. 4.

It will in any case be apparent that the forms of execution of the invention which have just been described have been given solely by way of example without implied limitation and that any number of modifications may be contemplated without thereby departing either from the scope or the spirit of this invention.

What we claim is:

1. In combination with an activatable reserve battery having $n$ activatable cells connected in series with $n$ being at least equal to two, said battery further having $(n+1)$ testing connectors with one of the testing connectors being connected to the input of the first series-connected cell and another of the testing connectors being connected to the output of the last series-connected cell, each of the remaining $(n-1)$ testing connectors being respectively connected between adjacent pairs of cells, a testing device for determining in a single test operation whether any of said cells have been accidentally activated prior to intentional activation of said battery, said device comprising:

indication means having two inputs for indicating when a cell has been accidentally activated;

connector means for electrically interconnecting said battery to said indicator means, said connector means including a socket-type connector member and a plug-type connector member which are releasably engageable for testing said battery;

one of said connector members being electrically connected to said battery and having said $(n+1)$ testing connectors connected thereto, the other of said connector members having $(n+1)$ testing terminals thereon adapted to electrically contact the respective $(n+1)$ testing connectors of said one connector member when said connector members are in engagement with each other; and means for electrically connecting said other connector member to said indicator means, said means including first and second electrically conductive elements each connected to one of the two inputs of said indicator means, every other one of the $(n+1)$ testing terminals being connected to the first electrically conductive element only and the remaining testing terminals being connected to the second conductive element only.

2. An activatable reserve battery consisting of $n$ activatable cells connected in series with $n$ being at least equal to two, terminal means coacting with said cells for permitting testing of said cells to determine in a single test operation if any of said cells has been accidentally activated prior to intentional activation of said battery, said terminal means including $(n+1)$ test terminals with one of said terminals being connected to the input of the first of the cells connected in series and another of the terminals being connected to the output of the last of the cells connected in series, each of the remaining $(n-1)$ test terminals being respectively connected between adjacent pairs of cells, said terminal means further including a connector member having said $(n+1)$ test terminals thereon, said connector member comprising a portion of a plug-and-socket connector for permitting the battery to be interconnected to an indicating device for testing purposes, said plug and socket connector including means connectable to said test terminals for segregating said test terminals into first and second isolated groups of mutually connected test terminals, one of said groups of test terminals being connected to one end of each said cell, the other of said groups of test terminals being connected to the remaining end of each said cell, said one ends of said cells being the positive end of one cell, the negative end of the next cell and so forth for the entire series of cells in the battery.

3. An activatable reserve battery comprising $n$ activatable cells connected in series with $n$ being at least equal to two, said battery having a pair of external output terminals with one of said output terminals being connected to the input of the first series-connected cell and the other output terminal being connected to the output of the last series-connected cell, means for permitting the battery to be tested prior to activation thereof for determining whether any of the cells have been accidentally activated, said means including a pair of battery-testing connected terminals and a pair of conductive members each one of which is electrically connected to a respective one of said testing connector terminals, and a series of $(n+1)$ test terminals with one test terminal being connected to the input of said first cell and another of the test terminals being connected to the output of said last cell, each of the remaining $(n-1)$ test terminals being respectively connected between adjacent pairs of cells, every alternate one of said series of said $(n+1)$ test terminals further being connected to one of said two conductive members and the remaining ones of said series of $(n+1)$ test terminals being connected to the other of said two conductive members.

4. A battery according to claim 3, wherein connection of the test terminals of the battery to the two conductor members are inside the battery.

5. A battery according to claim 3, wherein each test terminal comprises a conductive line connected between the series of cells and one of said conductive members, each of said conductive lines having resistance means connected in series therewith.

6. A battery according to claim 3 wherein each of said two conductive members comprises a series of resistances, said resistances being connected between pairs of said test terminals connected to said conductive member.

7. A device for testing an activatable battery having $n$ activatable cells connected in series with $n$ being at least equal to two, the battery further having $(n+1)$ test terminals with one of the test terminals being connected to the input of the first cell connected in the series and another of the test terminals being connected to the output of the last cell connected in the series, each of the remaining ($n-1$) test terminals being respectively connected between adjacent pairs of cells, said device enabling testing of said battery in a single operation to determine whether any of the cells of the battery have been accidentally activated prior to intentional activation of the battery, said device comprising a connector member having first and second conductive elements and ($n+1$) connector terminals adapted to be respectively electrically connected to the ($n+1$) test terminals of the battery, said connector terminals being electrically connected to the first and second conductive elements so that said first conductive element connects to every second one of said ($n+1$) connector terminals and said second conductive element connects to the remainder of said connector terminals, and said first and second electrically conductive elements being adapted to be connected to the input and output terminals of an indicating device.

8. A device according to claim 7, wherein said connector member is of the plug type.

References Cited

UNITED STATES PATENTS

| | | | |
|---|---|---|---|
| 964,995 | 3/1910 | Marko | 324—29.5 |
| 1,887,656 | 11/1932 | Myers | 324—29.5X |
| 2,621,231 | 12/1952 | Medlar et al. | 324—29.5 |
| 3,082,371 | 3/1963 | Foust et al. | 324—29.5 |
| 3,061,827 | 10/1962 | Fiandt et al. | 324—29.5X |

FOREIGN PATENTS

| | | | |
|---|---|---|---|
| 599,415 | 3/1948 | Great Britain | 324—29.5 |

RUDOLPH V. ROLINEC, Primary Examiner

R. J. CORCORAN, Assistant Examiner

U.S. Cl. X.R.

136—182; 340—249